(12) United States Patent
Maekawa et al.

(10) Patent No.: US 10,851,253 B2
(45) Date of Patent: Dec. 1, 2020

(54) IMAGE FORMING METHOD AND IMAGE FORMING APPARATUS

(71) Applicants: Tsutomu Maekawa, Ibaraki (JP); Koji Katsuragi, Kanagawa (JP); Takashi Tamai, Kanagawa (JP); Atsufumi Hanazawa, Tokyo (JP); Dongsik Jang, Tokyo (JP)

(72) Inventors: Tsutomu Maekawa, Ibaraki (JP); Koji Katsuragi, Kanagawa (JP); Takashi Tamai, Kanagawa (JP); Atsufumi Hanazawa, Tokyo (JP); Dongsik Jang, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/354,834

(22) Filed: Mar. 15, 2019

(65) Prior Publication Data

US 2019/0284412 A1 Sep. 19, 2019

(30) Foreign Application Priority Data

Mar. 16, 2018 (JP) ................................. 2018-049248

(51) Int. Cl.
*C09D 11/322* (2014.01)
*B41J 2/01* (2006.01)
*C09D 11/40* (2014.01)
*B41J 11/00* (2006.01)
*B41M 5/00* (2006.01)

(52) U.S. Cl.
CPC ............... *C09D 11/322* (2013.01); *B41J 2/01* (2013.01); *B41J 11/002* (2013.01); *B41M 5/0023* (2013.01); *C09D 11/40* (2013.01)

(58) Field of Classification Search
CPC ....... C09D 11/322; C09D 11/40; C09D 11/32; C09D 11/106; C09D 11/037; B41M 5/0023; B41M 7/009; B41J 11/002; B41J 2/01
USPC ......................................................... 347/102
See application file for complete search history.

(56) References Cited

U.S. PATENT DOCUMENTS

| 2008/0165237 A1* | 7/2008 | Yamauchi | ............... B41J 11/002 347/102 |
| 2015/0118452 A1* | 4/2015 | Ohashi | ................. C09D 175/04 428/196 |
| 2016/0101635 A1* | 4/2016 | Hoshino | ................ B41J 11/002 347/102 |
| 2016/0272828 A1 | 9/2016 | Takamura et al. | |
| 2017/0247556 A1 | 8/2017 | Yokohama et al. | |
| 2017/0313896 A1* | 11/2017 | Katsuragi | ............. C09D 11/108 |

FOREIGN PATENT DOCUMENTS

| JP | 7-026184 | 1/1995 |
| JP | 2001-049146 | 2/2001 |
| JP | 2002-356633 | 12/2002 |
| JP | 2005-126585 | 5/2005 |
| JP | 2009-191118 | 8/2009 |

(Continued)

*Primary Examiner* — Huan H Tran
*Assistant Examiner* — Alexander D Shenderov
(74) *Attorney, Agent, or Firm* — Oblon, McClelland, Maier & Neustadt, L.L.P.

(57) ABSTRACT

An image forming method includes applying white ink containing hollow resin particulate to a recording medium and contacting a heating roller having a diameter of 200 mm or less with a first surface of the recording medium.

17 Claims, 2 Drawing Sheets

(56) References Cited

FOREIGN PATENT DOCUMENTS

| | | |
|---|---|---|
| JP | 2011-046861 | 3/2011 |
| JP | 2011-062946 | 3/2011 |
| JP | 2015-054883 | 3/2015 |
| JP | 2015-098598 | 5/2015 |
| JP | 2015-128876 | 7/2015 |
| JP | 2016-078428 | 5/2016 |

* cited by examiner

IMAGE FORMING METHOD AND IMAGE FORMING APPARATUS

CROSS-REFERENCE TO RELATED APPLICATIONS

This patent application is based on and claims priority pursuant to 35 U.S.C. § 119 to Japanese Patent Application No. 2018-049248, filed on Mar. 16, 2018, in the Japan Patent Office, the entire disclosures of which are hereby incorporated by reference herein.

BACKGROUND

Technical Field

The present disclosure relates to an image forming method and an image forming apparatus.

Description of the Related Art

Typically, in order to demonstrate white on a transparent recording medium or color a colored recording medium with color ink, a printing surface of a colored recording medium is covered with white liquid ink containing hollow resin particulate, which has a small specific gravity and does not easily precipitate, in terms of enhancement of transparency of the transparent recording medium or coloring property of the color ink on the transparent recording medium.

SUMMARY

According to embodiments of the present disclosure, provided is an image forming method which includes applying white ink containing hollow resin particulate to a recording medium and contacting a heating roller having a diameter of 200 mm or less with a first surface of the recording medium.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
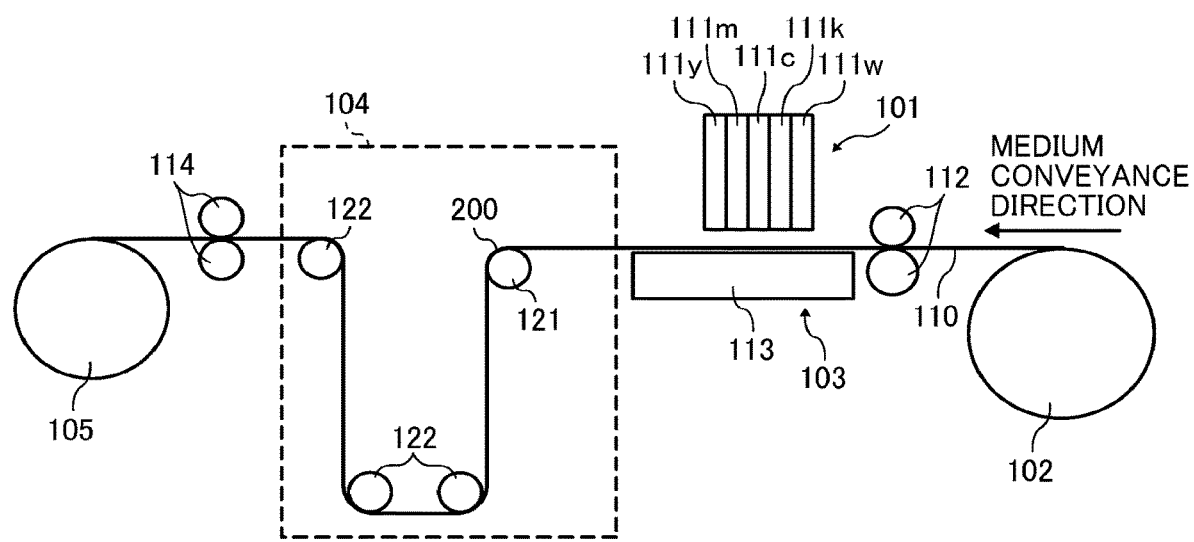
FIG. 1 is a diagram illustrating an example of the image forming apparatus according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

A white ink composition has been proposed which contains a white coloring material and a fixing resin mixture having a mass ratio of a urethane-based resin to an acrylic-based resin of from 10:2 to 10:5 with the urethane-based resin having an average particle diameter of 100 nm. As the white coloring material, at least one of metal compounds and hollow resin particulate are contained.

Also, an ink for an inkjet receptive concealing layer has been proposed in which a glycol-based solvent having a boiling point of 100 degrees C. or higher, white particulate, and a fluorescent material are mixed.

An ink composition has been proposed which contains a white pigment, a polymer, a fluorescent whitener, etc., while the polymer contains an aromatic mono-functional ethylenically unsaturated compound and a compound selected from N-vinyl lactams and a mono-functional ethylenically unsaturated compound having an alicyclic structure. The white pigment can be a hollow polymer.

A recording method has been proposed which includes causing white ink to contain two or more different types of white coloring materials. Hollow resin particulate and/or titanium dioxide are used as the two or more different types of white coloring materials.

An aqueous resin composition has been proposed which contains a synthetic resin emulsion polymer and hollow resin particulate having a glass transition temperature of from 40 to 140 degrees C.

An image forming apparatus has been proposed which includes a medium heating device that contacts a surface of a medium opposite to the surface on which an image is formed to heat the medium, and a roller member having a contact surface having a particular curvature that contacts the medium.

According to the present disclosure, an image forming method is provided which is capable of producing an image having a high lightness at a white solid portion and preventing cockling of thin paper.

The present disclosure relates to the following 1 and also includes the following 2 to 10 as embodiments.

1. An image forming method includes applying white ink containing hollow resin particulate to a recording medium and contacting a heating roller having a diameter of 200 mm or less with a first surface of the recording medium.

2. The image forming method according to 1 mentioned above, wherein the hollow resin particulate has a 50 percent volume particle diameter (d50) of from 0.4 to 0.6 μm and the ratio (Y/X) of the maximum intensity Y of 1730 cm$^{-1}$±10 cm$^{-1}$ to the maximum intensity X of 1600 cm$^{-1}$±10 cm$^{-1}$ according to infrared spectroscopy of from 3.0 to 6.0.

3. The image forming method 1 or 2 mentioned above, wherein the contacting further includes secondarily contacting the heating roller with a second surface of the recording medium after the heating roller contacts the first surface.

4. The image forming method according to any one of 1 to 3 mentioned above, wherein the recording medium has a basis weight of 70 gsm or less and the application amount of the white ink is 3.0 mg/cm$^2$ or more.

5. The image forming method according to any one of 1 to 4 mentioned above, wherein the white ink contains a coumarin derivative or a benzoxazole derivative, 6. The image forming method according to any one of 1 to 5 mentioned above, wherein the white ink contains an ultraviolet absorbent.

7. The image forming method according to any one of 1 to 6 mentioned above, wherein the white ink contains one or more organic solvents, wherein the mixing SP value of the one or more organic solvents accounting for 3 percent by mass or more of the white ink is from 12.0 to 15.0 (cal/cm$^3$)$^{0.5}$.

8. The image forming method according to any one of 1 to 7 mentioned above, wherein the white ink contains resin particulate comprising at least one of urethane resin particulate and acrylic styrene resin particulate, wherein the mixing SP value of the resin particulate accounting for 0.1 percent by mass of the white ink is from 8.0 to 10.0 (cal/cm$^3$)$^{0.5}$.

9. The image forming method according to any one of 1 to 8 mentioned above, wherein, in the contacting, the heating roller is in contact with the recording medium over the entire region in the width direction of the recording medium, which is perpendicular to the conveying direction of the recording medium.

10. An image forming apparatus includes a white ink containing hollow resin particulate, a white ink applying device configured to apply the white ink to a recording medium, and a heating roller having a diameter of 200 mm or less configured to contact the recording medium to which the white ink has been applied.

The image forming method (hereinafter also referred to as recording method) of the present disclosure includes applying white ink containing hollow resin particulate to a recording medium and bringing a heating roller having a diameter of 200 mm or less into contact with a first surface of the recording medium.

The white ink contains hollow resin particulate having excellent anti-precipitation property and is applied to the recording medium, and the formed white image is subjected to contact-drying by a heating roller having a diameter of 200 mm or less, so that cockling of the recording medium is corrected, drying property of the hollow resin particulate is enhanced, and the recording medium is free of cockling, thereby appropriately arranging the hollow resin particulate to improve lightness (degree of whiteness). When the diameter of the heating roller exceeds 200 mm, bending of the recording medium to be pressed against the heating roller becomes small, which has an adverse impact on the effect. The diameter of the heating roller is preferably from 30 to 200 mm.

The heating roller can be brought into contact with the recording medium from the printed surface or the back side of the printed surface and dried. The printed surface and the back sided can be the first surface mentioned above. The second surface is opposite to the first surface. It is also possible to bring the heating roller into contact with the back side of the recording medium to dry it and thereafter bring the heating roller into contact with the printed surface of the recording medium to dry it or other way round, which enhances lightness.

For example, when the recording medium is brought into contact with the heating roller from the back surface of the printed image on the recording medium, the thus-dried recording medium is turned over, and another image is printed on the back surface, the heating roller is brought into contact with the back side on which the secondarily printed image is formed to dry the recording medium after the double side printing. That is, the heating roller is firstly brought into contact with the firstly printed surface. Due to this contact of the heating roller to the white image surface, lightness is enhanced. Also, it is possible to bring different heating rollers into contact with the respective surfaces.

White Ink

In the present disclosure, the white ink contains hollow resin particulate and other optional components such as a fluorescent whitener, an ultraviolet absorbent, an organic solvent, water, a resin, and an additive.

The white coloring material contains the hollow resin particulate and other optional coloring materials.

Hollow Resin Particulate

The hollow resin particulate for use in the present disclosure has a hollow inner layer and an outer layer formed of a resin, and the outer diameter thereof is preferably from 0.1 to 1 μm, and the inner diameter is preferably from 0.04 to 0.8 μm. Since the inner layer is hollow, specific gravity as white ink is about 1 so that, unlike metal oxides, which has a large specific gravity, the white ink does not precipitate over time. In order to avoid precipitation over time, it is preferable that the thickness of the resin of the hollow resin particulate be 10 to 20 percent to the size of the entire hollow resin particulate.

For the purpose of improving the lightness and the heat resistance of the hollow resin particulate, the hollow resin particulate for use in the present disclosure preferably contains the structure unit represented by the following Chemical formula 1 and at least one of the structure unit represented by the following Chemical formula 2, the structure unit represented by the following Chemical formula 3, and the structure unit represented by the following Chemical formula 4, or a copolymer formed of the structure unit represented by the following Chemical formula 1 and at least one of the structure unit represented by the following Chemical formula 2, the structure unit represented by the following Chemical formula 3, and the structure unit represented by the following Chemical formula 4.

According to infrared spectroscopy (IR) spectrum of the dried white ink film, the hollow resin particulate preferably has a ratio (Y/X) of the maximum intensity Y in 1730 cm$^{-1}$±10 cm$^{-1}$ to the maximum intensity X in 1600 cm$^{-1}$±10 cm$^{-1}$ of from 3.0 to 6.0 and more preferably from 3.0 to 5.5.

Chemical formula 1

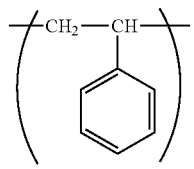

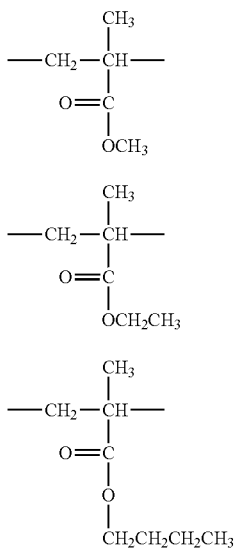

Chemical formula 2

Chemical formula 3

Chemical formula 4

The structure unit of Chemical formula 1 mainly helps to enhance the lightness and the structure unit of Chemical formula 2 to the structure unit of Chemical formula 4 mainly help to enhance heat resistance. The ratio of Chemical formula 1 to Chemical formulae 2 to 4 in the hollow resin particulate almost matches the ratio of Chemical formula 1 to Chemical formulae 2 to 4 in the hollow resin particulate in the white ink. IR spectrum of dried film of the hollow resin particulate is used to calculate the ratio. The ratio (Y/X) of the maximum intensity X in the absorption band of $1600\ cm^{-1} \pm 10\ cm^{-1}$ derived from carbonyl stretching vibration of the aromatic series of Chemical formula 1 and the maximum intensity of the absorption band of $1730\ cm^{-1} \pm 10\ cm^{-1}$ derived from carbonyl stretching vibration of Chemical formulae 2 to 4, in the present disclosure, this ratio is preferably from 3.0 to 6.0. When the ratio (Y/X) is 3.0 or greater, the heat resistance of the hollow resin particulate can be enhanced, which consequently makes it possible to reduce degradation of lightness ascribable to dissolution of the resin of the hollow resin particulate caused by energy such as heat. Conversely, when the ratio (Y/X) is 6.0 or less, lightness of the hollow resin particulate increases and additionally precipitation of the hollow particles can be improved. The ratio (Y/X) of Chemical formula 1 and Chemical formulae 2 to 4 in the hollow resin particulate is also preferably from 3.0 to 6.0.

In the present disclosure, the 50% volume particle diameter (d50) of the hollow resin particulate is preferably from 400 to 600 nm. When the 50% volume particle diameter (d50) is 400 nm or more, it is possible to secure lightness even for a recording medium such as woodfree paper. Conversely, when the 50% volume particle diameter (d50) is 600 nm or less, it is possible to improve precipitation and discharging stability. The 50% volume particle diameter (d50) means the particle diameter at 50 percent of the accumulated curve which is obtained as the entire volume of a group is defined as 100 percent.

The proportion of the hollow resin particulate in the white ink is preferably from 5 to 20 percent by mass and more preferably from 8 to 15 percent by mass. Due to this proportion of 5 percent by mass or more, it is possible to secure the film thickness of the white ink even for a recording medium such as woodfree paper. Conversely, when the proportion is 20 percent by mass or less, it is possible to improve precipitation and discharging stability.

The thickness of the resin layer of the hollow resin particulate in the white ink is preferably from 30 to 100 nm and more preferably from 40 to 60 nm. When the thickness of the resin layer of the resin hollow particulate is 30 nm or more, it is possible to reduce a decrease in lightness caused by dissolution of the resin of the hollow resin particulate ascribable to energy such as heat. Conversely, when the resin layer thickness is 100 nm or less, it is possible to improve precipitation and discharging stability.

The thickness of the resin layer can be determined from the particle size by using an electron microscope (SEM, TEM).

The hollow ratio proportion of the hollow resin particulate in the white ink is preferably from 30 to 60 percent by mass and more preferably from 30 to 50 percent by mass. When the hollow ratio is 30 percent or more, it is possible to improve precipitation and discharging stability. Conversely, when the hollow ratio of the hollow resin particulate is 60 percent or less, aiming lightness can be demonstrated without an affection of the background color of the recording medium. The hollow ratio of the hollow resin particulate is calculated by the following relation 1.

Hollow ratio={(volume of void)/(volume of entire particulate)}×100          Relation 1

The hollow ratio is the volume porosity, and the volume of the void can be obtained from the weight of the water contained in the hollow portion. Specifically, it can be determined from the ratio of the weight of the precipitated particulate obtained by centrifuging a liquid dispersion to the weight thereof obtained after drying.

The glass transition temperature of the hollow resin particulate in the white ink is preferably from 100 to 140 degrees C., more preferably from 110 to 130 degrees C. When the glass transition temperature of the hollow resin particulate is 100 degrees C. or higher, it is possible to reduce a decrease in lightness caused by dissolution of the resin of the hollow resin particulate ascribable to energy such as heat. Conversely, when the glass transition temperature of the hollow resin particulate is 140 degrees C. or lower, aiming lightness can be demonstrated without an affection of the background color of the recording medium.

When preparing printed matter using the white ink for use in the present disclosure, the thickness of the ink film forming the printing layer is preferably from 4 to 20 μm and more preferably from 10 to 17 μm. When the thickness of the ink film is 4 μm or more, aiming lightness can be demonstrated without an affection of the background color of the recording medium. Conversely, when the thickness of the ink film is 20 μm or less, fixability and productivity can be maintained.

In addition, when 3.0 mg/cm$^2$ or more of the white ink is applied to thin paper of recording medium having a basis weight of 70 gsm or less, cockling (undulation of the paper) occurs, thereby degrading quality of printed matter or causing stacked paper unstable. This can be relieved and the paper is made smooth by bringing a heating roller into contact with the paper.

Method of Manufacturing Hollow Resin Particulate

The method of preparing the hollow resin particulate is not particularly limited, and a known method can be applied. As the preparation method of the hollow resin particulate, it is possible to employ, for example, the so-called emulsion polymerization method in which a vinyl monomer, a surfactant, a polymerization initiator, a cross-linking agent, and an aqueous dispersion medium are stirred while being heated in nitrogen atmosphere to form a hollow resin particulate emulsion.

An example of the vinyl monomer is a non-ionic mono-ethylene unsaturated monomer. Specific examples include, but are not limited to, styrene, vinyl toluene, ethylene, vinylacetate, vinyl chloride, vinylidene chloride, acrylonitrile, (meth)acrylamide, and (meth)acrylate.

Specific examples of the (meth)acrylate include, but are not limited to, methylacrylate, methylmethacrylate, ethyl (meth)acrylate, butyl(meth)acrylate, 2-hydroxyethylmethacrylate, 2-ethylhexyl(meth)acrylate, benzyl(meth)acrylate, lauryl(meth)acrylate, oleyl(meth)acrylate, palmityl(meth)acrylate, and stearyl(meth)acrylate.

In addition, it is possible to use a di-functional vinyl monomer as the vinyl monomer. As the di-functional monomer, specific examples include, hut are not limited to, divinylbenzene, aryl methacrylate, ethyl ethyleneglycol dimethacrylate, 1,5-butane diol dimethacrylate, diethyleneglyco dimethacrylate, trimethylol propane dimethacrylate. The mono-functional vinyl monomer mentioned above and the di-functional vinyl monomer mentioned above are copolymerized for high level cross linking, so that hollow resin particulate having good light scattering property, heat resistance, chemical resistance, and solvent dispersibility is obtained.

As the surfactant, articles forming molecule aggregation such as micelle in water are suitable. Examples are anionic surfactants, non-ionic surfactants, cationic surfactants, and amphoteric surfactants.

As the polymerization initiator, known water-soluble compounds are usable. Examples are hydrogen peroxide and potassium persulfate.

As the cross-linking agent, a known compound soluble in water can be used. Specific examples include, but are not limited to, ethylene dimethacrylate, tetraethylene glycol dimethacrylate, and 1,3-diethylbenzene.

Examples of the aqueous solvent medium are water and a hydrophilic organic solvent.

Fluorescent Whitener

A fluorescent whitener absorbs ultraviolet rays on the short wavelength side, which is invisible, turns it into a visible violet to blue light, and is also referred to as a fluorescent dye. In the present disclosure, this fluorescent whitener is used to enhance lightness.

The fluorescent whitener for use in the present disclosure preferably has a structure represented by the following Chemical formula 5 or 6.

Chemical formula 5

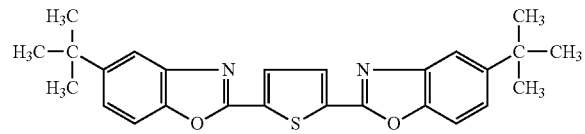

Chemical formula 6

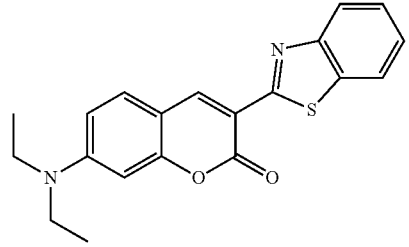

As the fluorescent whitener, benzoxazole or a derivative thereof is preferable, and a compound having, a structure represented by Chemical formula 5 is preferable as the benzoxazole derivative. In addition, as the fluorescent whitener, coumarin or a derivative thereof is preferable, and a compound having a structure represented by Chemical formula 6 is preferable as the coumarin derivative. It may be either hydrophilic or hydrophobic fluorescent whitener to which a hydroxyl croup, etc. is added at the terminal.

The proportion of the fluorescent whitener in the white ink is preferably from 0.001 to 1 percent by mass and more preferably from 0.005 to 0.2 percent by mass. Conversely, when the proportion of the fluorescent whitener is 0.001 percent by mass or more, aiming lightness can be demonstrated without an affection of the background color of the recording medium. Conversely, when the proportion is 1 percent by mass or less, it is possible to diminish the concentration quenching phenomenon in which incident light is immediately absorbed or the fluorescence intensity decreases due to collision between molecules.

Specific examples of the fluorescent whitener available on the market include, but are not limited to, TINOPAL OB (manufactured by BASF Corporation), Nikkafluor OB and Nikkabright PAW-L, and Nikkafluor MCT (manufactured by Nippon Chemical Industrial Co., Ltd.).

Fluorescent Whitening Enhancer

In the present disclosure, a fluorescent whitening enhancer can be used to improve the effect of the fluorescent whitener. The fluorescent whitening enhancer improves dispersibility of the fluorescent whitener and enhances the effect of the fluorescent whitener by surface migration. A specific example is polyether polyol.

The proportion of the fluorescent whitening enhancer in the white ink is preferably from 0.2 to 2 percent by mass and more preferably from 0.5 to 2 percent by mass. When the proportion of the fluorescent whitening enhancer is 0.2 percent by mass or more, aiming lightness can be demonstrated without an affection of the background color of the recording medium. Conversely, when the proportion is 2 percent by mass or less, discharging stability can be improved.

A specific example of the fluorescent whitening enhancer available on the market is Optiact I-10 (manufactured by San Nopco Ltd.).

Ultraviolet Absorbent

In the present disclosure, an ultraviolet absorbent may be used as a material to improve light resistance when a fluorescent whitener is used. The ultraviolet absorbent improves light resistance by absorbing ultraviolet rays, and specifically includes a benzophenone ultraviolet absorbent, a benzotriazole ultraviolet absorbent, a salicylate ultraviolet absorbent, a cyanoacrylate ultraviolet absorbent, a nickel complex salt type ultraviolet absorbent.

Specific examples of the benzophenone ultraviolet absorbents include, but are not limited to, 2-hydroxy-4-n-octoxybenzophenone, 2-hydroxy-4-n-dodecyloxy benzophenone, 2,4-dihydroxy benzophenone, 2-hydroxy-4-methoxybenzophenone, and 2,2',4,4'-tetrahydroxy benzophenone.

Specific examples of the benzotriazole ultraviolet absorbents include, but are not limited to, 2-(2'-hydroxy-5'-tert-octylphenyl)benzotriazole, 2-(2'-hydrozy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Specific examples of the salicylate ultraviolet absorbents include, but are not limited to, phenyl salicylate, p-tert-butylphenyl salicylate, and p-octylphenyl salicylate.

Specific examples of the cyanoacrylate ultraviolet absorbents include, but are not limited to, ethyl-2-cyano-3,3'-diphenylacrylate, butyl-2-cyano-3-methyl-3-(p-methoxyphenyl)acrylate, and methyl-2-cyano-3-methyl-3-(p-methoxyphenyl)acrylate.

Specific examples of the nickel complex salt type ultraviolet absorbents include, but are not limited to, nickel-bis(octylphenyl)sulfide, 2,2'-thiobis(4-tert-octyl ferrate)-n-butylamine nickel (II), 2,2'-thiobis(4-tert-octyl ferrate)-2-ethylhexyl amine nickel (II), and 2,2'-thiobis(4-tert-octyl ferrate)triethanol amine nickel (II).

The proportion of the ultraviolet absorbent in the ink is preferably from 0.01 to 1 percent by mass and more preferably from 0.05 to 0.5 percent by mass.

Organic Solvent

As the organic solvent for use in the present disclosure, the mixing solubility parameter value (hereinafter referred to as SP value) calculated from the solubility parameter of the organic solvents in the white ink is preferably from 12.0 to 15.0 $(cal/cm^3)^{0.5}$. When the mixing SP value of the organic solvents is 12.0 $(cal/cm^3)^{0.5}$ or more, dissolution of the resin of the hollow particulate in the organic solvent can be reduced. Conversely, when the mixing SP value of the organic solvents is 15.0 $(cal/cm^3)^{0.5}$ or less, it is possible to reduce deterioration of fixability ascribable to poor drying.

The solubility parameter (SP value) is defined by the regular solution theory introduced by Hildebrand, and the SP value described in the present disclosure is a value calculated by the Fedors method.

Taking the total volume of the organic solvent as 1, the volume fraction and SP value of each solvent are obtained to calculate the mixing SP value of the organic solvent contained in the white ink according to the following relation.

Mixing SP value $(cal/cm^3)^{0.5}$ of organic solvents in white ink=[SP value of organic solvent $A$×volume fraction of organic solvent $A$]+ . . . +[SP value of organic solvent $Z$×volume fraction of organic solvent $Z$]

In addition, although the organic solvents for use in the present disclosure includes articles classified as permeating agents, defoaming agents, etc. in terms of functionality, only the organic solvents accounting for 3 percent by mass or more of the ink is counted in the above-mentioned calculation of the SP.

There is no specific limitation to the organic solvent for use in the present disclosure. For example, water-soluble organic solvents can be used. Examples include, but are not limited to, polyols, ethers such as polyol alkylethers and polyol arylethers, nitrogen-containing heterocyclic compounds, amides, amines, and sulfur-containing compounds.

Specific examples of the water-soluble organic solvent include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzyl ether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use an organic solvent having a boiling point of 250 degrees C. or lower.

In addition, when the hydrogen bond term of the organic solvent is from 3.0 to 6.8 $(cal/cm^3)^{0.5}$ and the boiling point thereof is from 150 to 300 degrees C., fixability becomes good, which is preferable.

Hydrogen bond term can be obtained according to the atomic group aggregation method of treating organic molecules as atomic groups, which was proposed by Krevelen (Krevelen, Properties of Polymer, Third Edition, New York, p 200 to p 204).

Specific examples of the organic solvents satisfying these conditions specified above include, but are not limited to, glycerin, 1,2-propanediol, 1,3-propanediol, 1,2-butanediol, 1,3-butanediol, isoprene glycol, and an oxetane compound, which are particularly preferable.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethyl ether, and propyleneglycol monoethylether; and polyol arylethers such as ethyleneglycol monophenylether and ethyleneglycol monobenzylether.

The polyol compounds having eight or more carbon atoms and glycolether compounds enhance permeability of the white ink for paper used as a recording medium.

The proportion of the organic solvent in the white ink has no particular limit and can be suitably selected to suit to a particular application.

In terms of drying property and discharging reliability of the white ink, the proportion is preferably from 10 to 60 percent by mass and more preferably from 20 to 60 percent by mass.

Water

The proportion of water in the white ink is not particularly limited and can be suitably selected to suit to a particular application. For example, in terms of the drying property and discharging reliability of the white ink, the proportion is preferably from 10 to 90 percent by mass and more preferably from 20 to 60 percent by mass.

Resin Particulate

The type of the resin contained in the white ink has no particular limit and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particulate made of such resins can be also used. It is possible to mix a resin emulsion in which such resin particulate is dispersed in water as a dispersion medium with materials such as a coloring material and an organic solvent to obtain the white ink. It is possible to use suitably-synthesized resin particulate. Alternatively, the resin particulate is available on the market. These resin particulate can be used alone or in combination.

As the resin particulate, it is preferable to at least contain urethane resin particulate and/or acrylic styrene resin particulate. When at least urethane resin particulate and/or acrylic styrene resin particulate is added to the white ink, fixability can be improved with low viscosity.

The resin particulate is not hollow.

In order to prevent crushing of hollow resin particulate due to an impact, etc., Rockwell hardness (JIS Z2245, JIS B7726) of the hollow resin particulate is preferably from 80 to 130 and more preferably from 80 to 110.

It is preferable that the mixing SP value calculated from the SP values of the resin particulate be from 8.0 to 10.0 $(cal/cm^3)^{0.5}$. When the mixing SP value of the resin particulate is 8.0 $(cal/cm^3)^{0.5}$ or more, dissolution of the resin of the hollow resin particulate due to the resin particulate can be reduced. Conversely, when the mixing SP value is 10.0 $(cal/cm^3)^{0.5}$ or less, deterioration of fixability can be diminished.

In addition, the mixing SP value of the resin particulate contained in the white ink is calculated by the following relation.

Mixing SP $(cal/cm^3)^{0.5}$ value of resin particulate in white ink=[SP value of resin particulate $A$×volume fraction of resin particulate $A$]+ . . . +[SP value of resin particulate $Z$×volume fraction of resin particulate $Z$]

In addition, the SP value is calculated only for resin particulate accounting for 0.1 percent by mass or more of the entire white ink in the present disclosure.

The volume average particle diameter of the resin particle is not particularly limited and can be suitably selected to suit to a particular application. The volume average particle diameter is preferably from 10 to 1,000 nm, more preferably from 10 to 150 nm, and furthermore preferably from 10 to 100 nm to obtain good fixability and image robustness.

The volume average particle diameter can be measured by using, for example, a particle size analyzer (Nanotrac Wave-UT151, manufactured by MicrotracBEL Corp.).

The proportion of the resin is not particularly limited and can be suitably selected to suit to a particular application. In terms of fixability and storage stability of the white ink, it is preferably from 1 to 30 percent by mass and more preferably from 1 to 20 percent by mass to the total amount of the white ink.

The particle diameter of the solid portion in the white ink has no particular limit and can be suitably selected to suit to a particular application. For example, the maximum frequency in the maximum number conversion is preferably from 20 to 1,000 nm and more preferably from 400 to 600 nm to ameliorate the discharging stability and image quality such as image density. The solid portion includes resin particulate, pigment particulate, etc. The particle diameter can be measured by using a particle size analyzer (Nanotrac Wave-UT151, manufactured by MicrotracBEL Corp).

Lubricant

It is preferable that the white ink for use in the present disclosure contain wax or a siloxane compound to impart slippage to an image portion.

Of the wax, polyethylene wax or carnauba wax is preferable in terms of film forming property and slippage in particular when the white ink is applied to the image portion.

The melting point of the wax is preferably from 80 to 140 degrees C. and more preferably from 100 to 140 degrees C. When the melting point is 80 degrees C. or higher, wax does not excessively melt or coagulate, so that storage stability of the white ink is maintained. When the melting point is 140 degrees C. or lower, wax sufficiently melts in room temperature environment, so that slippage is imparted to the white ink.

The particle diameter of the wax is preferably 0.01 μm or greater and more preferably from 0.01 to 0.1 μm. When the particle diameter is 0.01 μm or greater, wax particles tend to be oriented to the surface of the white ink, thereby imparting slippage to the white ink.

As an example of the polyethylene wax, products available on the market such as High-Tech series, manufactured by TOHO Chemical Industry Co., Ltd. and AQUACER SERIES, manufactured by BYK are suitable.

The carnauba wax is available on the market. Examples include, but are not limited to, Selosol 524 and Trasol CN (both manufactured by CHUKYO YUSHI CO., LTD.).

The proportion of the wax is preferably from 0.1 to 5 percent by mass and more preferably 0.1 to 1 percent by mass.

Specific examples of the siloxane compound available on the market include, but are not limited to, BYK 307, BYK 333, BYK 378, manufactured by BYK-Chemie GmbH.

The proportion of the siloxane compound is preferably from 0.1 to 5 percent by mass and more preferably from 0.1 to 1 percent by mass.

Additive

Ink may further optionally include a surfactant, a defoaming agent, a preservative and fungicide, a corrosion inhibitor, a pH regulator, etc.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment. Specific examples include, but are not limited to, side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

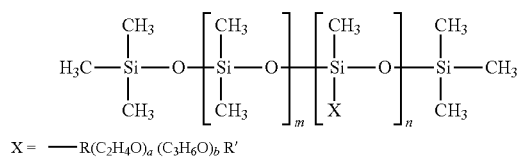

Chemical formula S-1

In the Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in the side chain thereof are preferable because these polymer compounds do not easily foam and the fluorochemical surfactant represented by the following Chemical formula F-1 or Chemical formula F-2 is more preferable.

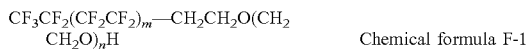

Chemical formula F-1

In the compound represented by Chemical formula F-1, m is preferably 0 or an integer of from 1 to 10 and n is preferably 0 or an integer of from 1 to 40.

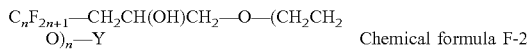

Chemical formula F-2

In the compound represented by the chemical formula F-2, Y represents H or $C_mF_{2m+1}$, where m represents an integer of from 1 to 6, or $CH_2CH(OH)CH_2—C_mF_{2m+1}$, where m represents an integer of from 4 to 6, or $C_pH_{2p+1}$, where p is an integer of from 1 to 19, "n" represents an integer of from 1 to 6. "a" represents an integer of from 4 to 14.

As the fluorochemical surfactant, products available on the market may be used. Specific examples include, but are not limited to, SURFLON S-111. S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in the ink is not particularly limited and can be suitably selected to suit to a particular application. For example, it is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to not lower than 7. Specific examples include, but are not limited to, amines such as diethanol amine and triethanol amine.

Properties of the white ink are not particularly limited and can be suitably selected to suit to a particular application. For example, viscosity, surface tension, and pH are preferably in the following ranges.

The viscosity of the white ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO. LTD.). The measuring conditions are as follows:

Standard cone rotor (1° 34'×R24)
Sample liquid amount: 1.2 mL
Rotational frequency: 50 rotations per minute (rpm)
25 degrees C.
Measuring time: three minutes The surface tension of the white ink is preferably 35 mN/m or less and more preferably 32 mN/m or less at 25 degrees C. in terms that the white ink is suitably leveled on a recording medium and the drying time of the ink is shortened.

The pH of the white ink is preferably from 7 to 12 and more preferably from 8 to 11 in terms of prevention of corrosion of metal materials in contact with the white ink.

Recording Medium

The recording medium is not particularly limited. Plain paper, gloss paper, special paper, cloth, etc. are usable. Also, good images can be formed on a non-permeable substrate.

The non-permeable substrate has a surface with low moisture permeability and low absorbency and includes a material having myriad of hollow spaces inside but not open to the outside. To be more quantitative, the substrate has a water-absorption amount of 10 mL/m$^2$ or less within 30 msec$^{1/2}$ of the contact of the ink according to Bristow method.

Recorded Matter

The white ink recorded matter includes a recording medium and an image formed on the recording medium with the white ink for use in the present disclosure.

The recorded matter is obtained by an inkjet recording device executing an inkjet recording method.

The image forming apparatus (hereinafter also referred to as recording device) of the present disclosure includes white ink containing hollow resin particulate, a white ink applying device to apply the white ink to a recording medium, and a heating roller having a diameter of 200 mm or less which is brought into contact with the recording medium onto which the white ink has been applied.

Hereinafter, an example in which black (K), cyan (C), magenta (M), and yellow (Y) are used is described. It is also possible to use the white ink in place of or in addition to those. Further, a transparent liquid composition containing no coloring material may be used.

Recording Device and Recording Method

The white ink for use in the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In the present disclosure, the recording device and the recording method respectively represent a device capable of discharging white ink, various processing liquids, etc. to a recording medium and a method of recording utilizing the device. The recording medium means an article to which white ink or various processing fluids can be temporarily or permanently attached.

The recording device may further optionally include a device relating to feeding, conveying, and ejecting a recording medium and other devices referred to as a pre-processing device, a post-processing device, etc. in addition to the head portion to discharge the white ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. The heating temperature is preferably from 100 to 200 degrees C. and more preferably from 120 to 150 degrees C. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as AO and a continuous printer capable of using continuous paper rolled up in a roll-like form as a recording medium.

Embodiments of the present disclosure are described with reference to the accompanying drawings. The image forming apparatus of the present disclosure is described using an example with reference to FIG. 1. FIG. 1 is a schematic diagram illustrating the image forming apparatus.

This image forming apparatus is a full-line type inkjet recording device and includes an image forming unit 101 constituted of a liquid discharging head to discharge liquid droplets of a required color onto a medium 110 as continuous paper to form an image thereon.

In the image forming unit 101, for example, a plurality of full-line type recording heads to discharge inks of plural colors are arranged and a recording head 111w is disposed on the most upstream side in the conveying direction. Each recording head 111 (recording head 111w, recording head 111k, recording head 111c, recording head 111m, and recording head 111y) individually discharges droplets of white W, black K, cyan C, magenta M, and yellow Y to the medium 110 during conveyance. The kind and the number of colors are not limited thereto.

The medium 110 is unreeled from a reel-down roller 102, sent out onto a conveyance guiding member 113 disposed facing the image forming unit 101 by a conveyance roller 112 of a conveyance unit 103, and guided by the conveyance guiding member 113.

The medium 110 on which an image is formed by the image forming unit 101 is sent to and reeled up by a reel-up roller 105 via a drying device 104 for use in the present disclosure and ejection rollers 114.

Next, the drying device 104 includes a heating roller 121 as a roller member which is a contact member constituting the medium heating device, and a plurality of guide rollers 122.

The heating roller 121 is disposed at a position where the heating roller 121 contacts the back surface to the image formed surface of the medium 110.

The heating roller 121 is a contact member having a peripheral surface including a contact surface 200 having a predetermined curvature which is brought into contact with the medium 110. The medium 110 is in close contact with the contact surface 200 in the contact range along the medium conveyance direction over the entire region along the width direction orthogonal to the medium conveyance direction.

That is, the curvature of the peripheral surface serving as the contact surface 200 of the heating roller 121 is determined as the curvature at which the medium 110 is in contact with the contact surface 200 over the entire region in the width direction orthogonal to the medium conveyance direction.

Specifically, the heating roller 121 has a diameter of 200 mm or less.

At this point in time, as for the lower limit value of the radius of the heating roller 121, it is preferable that the radium be 30 mm or more in terms that a heat source is disposed inside, a strength is required, and as the pressing width (which is the length of the medium 110 in contact with the heating roller 121) of the medium 110 to heat the medium 110 increases, the heat is easily transferred to the medium 110.

Figure 3:
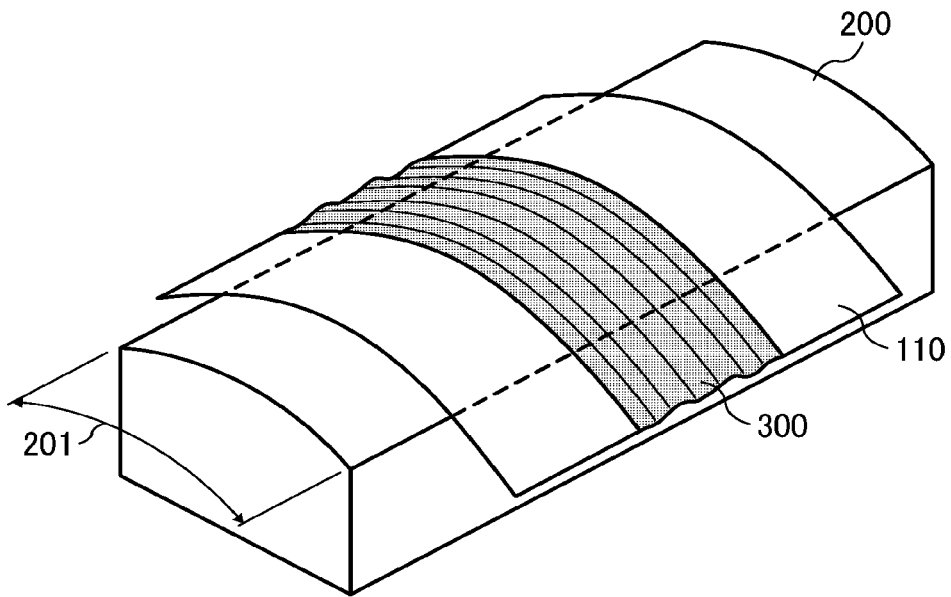
FIG. 3 is a diagram illustrating a perspective explanatory view of contact between a medium and a contact surface in Comparative Example, which is described later.

That is, like Comparative Example illustrated in FIG. 3, when the curvature of the contact surface 200 is small, i.e., the radius is large, due to cockling of the medium 110 caused by attachment of liquid during image forming, a portion appears at which the medium 110 is not in close contact with the contact surface 200 in the medium width direction orthogonal to the medium conveyance direction in a contact range 201 with the contact surface 200 in the medium conveyance direction.

As a result, heat is not transmitted from the contact surface 200 or only radiant heat is transmitted at a portion where the medium 110 floats from the contact surface 200 and is not in close contact with the contact surface 200, so that the medium 110 is not evenly dried in the width direction orthogonal to the conveyance direction, which degrades drying efficiency.

Figure 2:
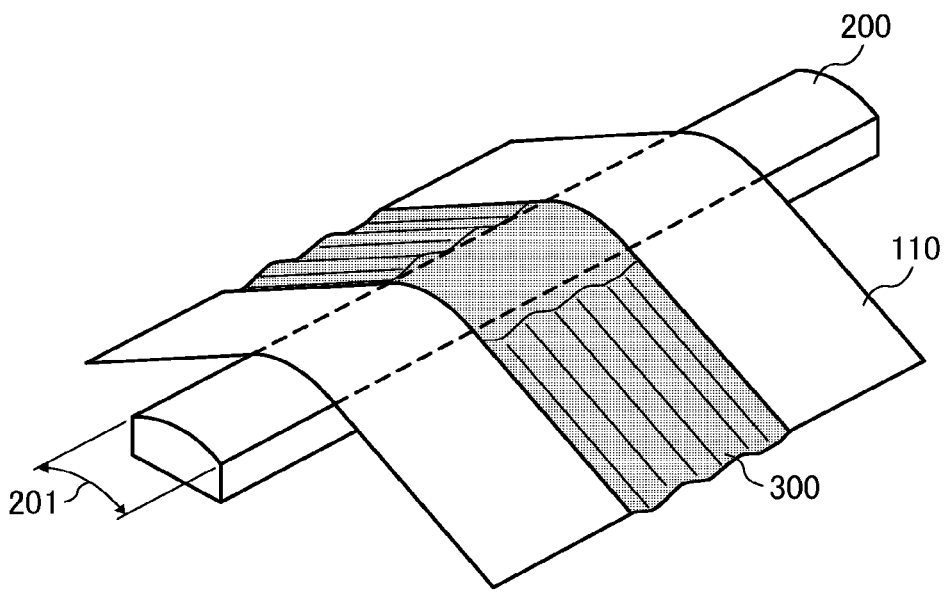
FIG. 2 is a diagram illustrating a perspective explanatory view of close contact between a medium and a contact surface in an embodiment of the present disclosure.

Conversely, like the embodiment illustrated in FIG. 2, when the curvature of the contact surface 200 is large, i.e., radius is small, cockling of the medium 110 caused by attachment of liquid during image forming is corrected so that the medium 110 is in close contact with the contact surface 200. That is, due to the correction of cockling, a portion where the medium 110 floats from the contact surface 200 and does not come into close contact therewith does not appear.

As a result, the medium 110 is brought into close contact with the contact surface 200 over the entire region along the width direction orthogonal to the medium conveyance direction, so that the heat of the contact surface 200 is directly transmitted to the medium 110. Therefore, the medium 110 is efficiently dried.

As described above, the medium is in close contact with the contact member over the entire range in the width direction orthogonal to the medium conveyance direction in the contact range in the medium conveyance direction, whereby the heating device efficiently heats the medium, so that the medium is quickly dried or the liquid droplet attached thereto can be promptly evaporated.

The recording head 111w discharges the white ink to the medium 110 and thereafter each of the color inks is applied thereto. It is preferable to bring the medium 110 into contact with the heating roller 121 between discharging of the white ink and discharging of the color inks. If the medium 110 is continuous roll paper, the white ink is applied and the continuous roll paper is reeled after the contact with the heating roller 121 and back to the feeding side followed by second printing. This is enabled when the heating roller 121 is disposed between the recording head 111w and the recording heads 111k, 111c, 111m, and 111y. If the medium 110 is a cut sheet, the recording head 111w applies the white ink to the medium 110, the cut sheet is conveyed to the upstream after the cut sheet is brought into contact with the heating roller 121, and thereafter the recording heads 111k, 111c, 111m, and 111y apply the color inks to the cut sheet. This is enabled when the heating roller 121 is disposed between the recording head 111w and the recording heads 111k, 111c, 111m, and 111y.

This recording device may include not only a portion of discharging the white ink but also devices referred to as a pre-processing device, a post-processing device, etc.

As an example of the pre-processing device and the post-processing device, like black (K), cyan (C), magenta (M), and yellow (Y) ink as in the case of the white ink, the pre-processing device and the post-processing device may further include a liquid accommodating unit including a pre-processing fluid or a post-processing fluid and a liquid discharging head to discharge the pre-processing fluid or the post-processing fluid by an inkjet printing method.

As another example of the pre-processing device and the post-processing device, it is suitable to dispose a pre-processing device and a post-processing device which do not employ the inkjet printing method but a blade coating method, a roll coating method, or a spray coating method.

Notably, the white ink is applicable not only by the inkjet printing method but can be widely applied by other methods. Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods.

The usage of the white ink of the present disclosure is not particularly limited and can be suitably selected to suit to a particular application. For example, the white ink can be used for printed matter, a paint, a coating material, and foundation. The white ink can be used to form two-dimensional texts and images and furthermore a three-dimensional solid object (solid freeform fabrication object) as a material for 3D modeling.

Any known device can be used as the solid freeform fabrication device to fabricate a solid fabrication object with no particular limit. For example, the device is formed of a container, a supplying device, and a discharging device, a drier, etc. of the white ink. The solid fabrication object can be manufactured by repeatedly coating the white ink. In addition, the solid fabrication object includes a molded processed product manufactured by processing a structure having a substrate such as a recording medium to which the white ink is applied. The molded processed product is manufactured from recorded matter or a structure having a sheet-like form, film-like form, etc. by, for example, heating drawing or punching. The molded processed product is suitably used for articles which are molded after surface-decorating. Examples are gauges or operation panels of vehicles, office machines, electric and electronic devices, cameras, etc.

Image forming, recording, printing, print, etc. in the present disclosure represent the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples and Comparative Examples but are not limited thereto. In Examples, "parts" and "%" are "parts by mass" and "percent by mass" unless otherwise specified.

Manufacturing of Hollow Resin Particulate

1. Synthesis of Seed Particle Emulsion 726.0 parts of deionized water, 5.0 parts of methylmethacrylate, and 0.1 parts of methacrylic acid were loaded in a four-necked separable flask equipped with a stirrer, a thermometer, a condenser, and a dripping funnel and thereafter heated while being stirred. When the internal temperature of the separable flask reached 70 degrees C., 1.0 part of 10 percent by mass ammonium persulfate aqueous solution was added and the system was heated at 80 degrees C. for 20 minutes. 141.0 parts of methyl methacrylate, 94.9 parts of methacrylic acid, 5.0 parts of alkylbenzene sodium sulfonate (Neogen SF-20, manufactured by DKS Co. Ltd.) as anionic emulsifier, and 120.0 parts of deionized water were emulsified by a homo disperser to prepare a pre-emulsion. Thereafter, the pre-emulsion was placed in the dripping funnel.

Next, while keeping the internal temperature of the separable flask at 80 degrees C., the thus-prepared pre-emulsion was uniformly dripped in three hours and at the same time, 10.0 parts of 10 percent ammonium persulfate aqueous solution were uniformly dripped in three hours. Subsequent to completion of the dripping, the resultant was aged at 80 degrees C. for three hours followed by cooling-down and filtrated by a filter cloth with 120 mesh to obtain a seed particle emulsion.

2. Synthesis of Hollow Resin Particulate

First Step Polymerization 188.2 parts of deionized water was loaded in a four-necked separable flask equipped with a stirrer, a thermometer, a condenser, and a dripping funnel. 66.0 parts of the thus-obtained seed particle emulsion was dripped thereto and thereafter, the resultant was heated to 80 degrees C. while being stirred. 2.4 parts of butyl acrylate, 1.1 parts of butylmethacrylate, 19.5 parts of methyl methacrylate, 0.7 parts of methacrylic acid, 5.0 parts of alkylbenzene sodium sulfonate (Neogen SF-20, manufactured by DKS Co. Ltd.), and 55.3 parts of deionized water were emulsified by a homo disperser to prepare a pre-emulsion 1. Thereafter, the pre-emulsion 1 was loaded in the dripping funnel. Next, while keeping the internal temperature of the separable flask at 80 degrees C., the thus-prepared pre-emulsion 1 was uniformly dripped in 30 minutes and at the same time, 1.2 parts of 10 percent sodium persulfate were uniformly dripped in 30 minutes.

Second Step Polymerization 75.0 parts of styrene, 5.0 parts of alkylbenzene sodium sulfonate (Neogen SF-20, manufactured by DKS Co. Ltd.), and 51.8 parts of deionized water were emulsified by a homo disperser to prepare a pre-emulsion 2. Thereafter, the pre-emulsion 2 was loaded in the dripping funnel. One hour after the completion of the dripping of the pre-emulsion 1, the thus-prepared pre-emulsion 2 was uniformly dripped in 60 minutes and at the same time, 3.5 parts of 10 percent sodium persulfate aqueous solution was uniformly dripped in 60 minutes while keeping the internal temperature of the separable flask at 80 degrees C. After the completion of the dripping of the pre-emulsion 2, 7.5 parts of 28 percent by mass ammonium water was dripped and the system was aged at 80 degrees C. for one hour to swell and dissolve the seed particle. Subsequent to cooling down, the resultant was filtrated with a filter cloth of 120 mesh to obtain a hollow resin particulate B.

A hollow resin particulate E was obtained in the same manner as the above except that the amount of styrene in Second Step Polymerization was changed to 22.3 parts. The maximum intensity X in the absorption band of 1600 $cm^{-1} \pm 10\ cm^{-1}$ of the hollow resin particulate and the maximum intensity Y in the absorption band of 1730 $cm^{-1} \pm 10\ cm^{-1}$ were measured by a microscopic FT-IR measuring instrument (iN10MX/iZ10, manufactured by Thermo Fisher Scientific K.K.) and analysis software (OMNIC) installed thereonto.

Examples 1 to 23 and Comparative Examples 1 to 6

Preparation of White Ink

First, the organic solvent, fluorescent whitener, fluorescent whitening enhancer, surfactant, defoaming agent, pH regulator, preservatives and fungicides, and deionized water shown in the table were stirred for 1 hour and homogeneously mixed. Next, the resin particulate and the lubricant composition were added followed by stirring for one hour to uniformly mix the system. Thereafter, a white coloring material was added to the mixture followed by stirring for one hour to uniformly mix the system. The thus-obtained mixture was filtrated with a polyvinilydene fluoride membrane filter having an average opening diameter of 5 μm under pressure to remove coarse particles and dust. Thus, white ink was obtained.

The maximum intensity X in the absorption band of 1600 cm$^{-1}$±10 cm$^{-1}$ and the maximum intensity Y in the absorption band of 1730 cm$^{-1}$±10 cm$^{-1}$ of the dried film of the white ink were measured by a microscopic FT-IR measuring instrument (iN10MX/iZ10, manufactured by Thermo Fisher Scientific K.K.) and analysis software (OMNIC) installed thereonto. Since the value of the white ink almost matched the value of the hollow resin particulate, its description is omitted.

White Coloring Material

Titanium dioxide (RCW-7, manufactured by Dainichiseika Color & Chemicals Mfg. Co., Ltd.): 50% volume particle diameter (d50) of 200 nm Hollow resin particulate A (ROPAQUE ULTRA E, manufactured by The Dow Chemical Company, Y/X=1.5, resin structure: Chemical formula 1/Chemical formula 2, 50% volume particle diameter (d50) of 400 nm, thickness of resin layer of 40 nm, hollow ratio of 51.0%

Hollow resin particulate B (obtained by the above-identified synthesis method): Y/X=3.0; resin structure: Chemical formula 1/Chemical formula 2, 50% volume particle diameter (d50) of 700 nm, thickness of resin layer of 60 nm, hollow ratio of 45.0%

Hollow resin particulate C (Cybinol X-213-913E-43, manufactured by Saiden Chemical Industry Co., Ltd., Y/X=4.9, resin structure: Chemical formula 1/Chemical formula 2/Chemical formula 3/Chemical formula 4, 50% volume particle diameter (d50) of 700 nm, thickness of resin layer of 100 nm, hollow ratio of 36.4%

Hollow resin particulate D (ROPAQUE HIT1432, manufactured by The Dow Chemical Company, Y/X=5.1, resin structure: Chemical formula 1/Chemical formula 2/Chemical formula 4, 50% volume particle diameter (d50) of 500 nm, thickness of resin layer of 60 nm, hollow ratio of 32.0%

Hollow resin particulate E (obtained by the above-identified synthesis method): Y/X=6.0; resin structure: Chemical formula 1/Chemical formula 2, 50% volume particle diameter (d50) of 700 nm, thickness of resin layer of 60 nm, hollow ratio of 30.1%

Hollow resin particle F (SX 868, manufactured by JSR Corporation, Y/X=9.3, 50% volume particle diameter (d50)=600 nm Organic Solvent Organic solvent A (glycerin, SP value=17.4 (cal/cm$^3$)$^{0.5}$, manufactured by Sakamoto Yakuhin Co., Ltd.)

Organic solvent B (1,2-propanediol, SP value=14.3 (cal/cm$^3$)$^{0.5}$, manufactured by Tokyo Chemical Industry Co., Ltd.)

Organic solvent C (1,2-butanediol, SP value=13.1 (cal/cm$^3$)$^{0.5}$, manufactured by Tokyo Chemical Industry Co., Ltd.)

Organic solvent D (3-ethyl-3-hydroxymethyloxetane, SP value=11.0 (cal/cm$^3$)$^{0.5}$, manufactured by Tokyo Chemical Industry Co., Ltd.)

Organic solvent E (2-ethyl-1,3-hexanediol, SP value=10.9 (cal/cm$^3$)$^{0.5}$, manufactured by Tokyo Chemical Industry Co., Ltd.)

Fluorescent Whitener

Fluorescent whitener A (Nikkabright PAW-L: hydrophilic benzoxazole fluorescent whitener, manufactured by Nippon Chemical Industrial Co., Ltd.)

Fluorescent whitener B (Nikkafluor OB: hydrophobic benzoxazole fluorescent whitener, manufactured by Nippon Chemical Industrial Co., Ltd.)

Fluorescent whitener C (TINOPAL OB: hydrophobic benzoxazole fluorescent whitener, manufactured by BASF SE)

Fluorescent whitener D (Nikkafluor MCT: hydrophobic coumarin fluorescent whitener, manufactured by Nippon Chemical Industrial Co., Ltd.)

Fluorescent Whitening Enhancer

Fluorescent whitening enhancer (Optiact I-10, manufactured by San Nopco Limited) (UV absorbent)

Ultraviolet absorbent (benzophenone, manufactured by Tokyo Chemical Industry Co., Ltd.)

Resin Particulate

Resin particulate A (Superflex 420, SP value=11.6 (cal/cm$^3$)$^{0.5}$, manufactured by DKS Co. Ltd.)

Resin particulate B (KP-543, SP value=7.5 (cal/cm$^3$)$^{0.5}$, manufactured by Shin-Etsu Silicone Co., Ltd.)

Lubricant

Polyethylene wax (AQUACER-539, manufactured by BYK-Chemie GmbH)

Carnauba wax (Selosol 524, manufactured by Chukyo Yushi Co., Ltd.)

Polydimethylsiloxane compound (BYK 333, manufactured by BYK-Chemie GmbH)

Surfactant

KF-640, manufactured by Shin-Etsu Silicone Co., Ltd.

Defoaming Agent

KM-72F, manufactured by Shin-Etsu Silicone Co., Ltd.

pH Regulator 2-amino-2-ethyl-1,3-propanediol, manufactured by Tokyo Chemical Industry Co., Ltd.

Preservatives and Fungicides

LV(S), manufactured by Avecia Inkjet Limited

Y/X Measurement of Hollow Resin Particulate

A sample of the hollow resin particulate obtained as described above was dried for 24 hours in a constant temperature bath (PR-3J, manufactured by ESPEC Corp.) set at 90 degrees C., and thereafter, measured with a micro FT-IR measuring instrument (iN10MX/iZ10, manufactured by Thermo Fisher Scientific K.K.) and analysis software (OMNIC). The maximum intensity X in the absorption band of 1600 cm$^{-1}$±10 cm$^{-1}$ and the maximum intensity Y in the absorption band of 1730 cm$^{-1}$±10 cm$^{-1}$ of the sample was measured.

Method for Measuring Precipitation

Precipitation of the hollow resin particulate in the white ink was measured as follows using a precipitation measuring device (Turbi Science Classic MA 2000, manufactured by EKOKO SETKT Co., Ltd.).

The white ink was subjected to ultrasonic treatment (100 W, 40 minutes) using an ultrasonic cleaner (US-3, manufactured by AS ONE Corporation) to make it homogeneous, and thereafter 5.5 mL of each white ink was loaded into a glass tube (screw cap test tube, manufactured by AS ONE Corporation) dedicated to the cleaner with a pipette.

The white ink was measured after the liquid level of the white ink in the glass tube was stabilized. This point in time was determined as the start of sedimentation evaluation. Thereafter, the glass tube was left alone at 25 degrees C. and measure until 168 hours later. Precipitation of the hollow resin particulate is confirmed by deviation display based on the precipitation evaluation starting time. Precipitation was confirmed as follows: accumulating the backscattered light intensity peaks accompanied by sedimentation of the hollow resin particulate (from 20 mm below the bottom of the glass tube to the liquid level), leaving the glass tube alone at 25 degrees C. for 168 hours, and calculating the average (percent) of the relative change percentage of supernatant.

The thus-obtained average was graded according to the following evaluation criteria. The white ink is practically usable when graded A or B.

A: −2 percent or higher
B: −4 to less than −2 percent
C: less than −4 percent

Measuring Method of Storage Stability

Under the following conditions, viscosity of the white ink was measured with a viscometer (RE-85L, manufactured by TOKI SANGYO KOGYO CO., LTD.) and the viscosity change rate between before and after storage was calculated and determined according to the following evaluation criteria. The white ink is practically usable when graded A or B.

Storage conditions: rested still for 14 days in a thermostatic chamber (PR-3J, manufactured by ESPEC Corp.) set at 70 degrees C.

A: ±2.5% change to initial viscosity
B: ±5% change to initial viscosity
C: Exceed±5% change to initial viscosity Print Method First, an image forming apparatus (IPSiO GXe 5500, manufactured by Ricoh Co., Limited) printed an image on a recording medium (Color High Quality Paper, Blue, Thin (thickness of about 0.08 mm, basis weight of 64.5 g/m$^2$, manufactured by Daio Paper Corporation) or a recording medium (high-quality paper, cinar color, light blue, paper thickness of 95 μm (0.095 mm), basis weight of 76.7 g/m$^2$, manufactured by APP JAPAN LIMITED) with the white ink shown in the table at a print resolution of 1200 dpi×1200 dpi, with a white ink adhesion amount of 3.0 mg/cm$^2$, followed by drying in a constant temperature bath (PR-3J, manufactured by ESPEC Corp.) set at 90 degrees C. for 60 seconds. Next, a print sample was prepared by bringing the heating roller heated to 120 degrees C. having the diameter shown in the table into contact with the back side to the printed surface and pressing the heating roller against the recording medium in the orthogonal direction to prepare a print sample. In Examples 5 and 6, furthermore, the heating roller was brought into contact with the printed surface and pressed to prepare a print sample. The print chart used was a solid image of 20 cm square formed with dot patterns.

Measuring Method of Lightness of Image Printed with White Ink

The lightness of the image printed with the white ink was measured with a spectrocolorimeter (939, manufactured by X-Rite). Incidentally, a lightness of 50 or more is a usable level, preferably 65 or more, more preferably 70 or more, and particularly preferably 85 or more.

Fixability Test

For the sample, the image was rubbed 20 times using 1.2 cm square cut paper (Lumi Art Gloss 90 gsm). Ink contamination transferred to the paper was measured by a reflection type color spectrodensitometer (manufactured by X-Rite) and the concentration of the ink contamination was calculated subtracting the color of backdrop of the abraded paper. The calculated concentration of the ink contamination was classified according to the following evaluation criteria to evaluate fixability. Grade A or B is preferable.

Evaluation Criteria

A: Concentration of ink contamination was less than 0.1
B: Concentration of ink contamination was from 0.1 to less than 0.2
C: Concentration of ink contamination was 0.2 or greater Cockling The sample was evaluated according to the following evaluation criteria: The white ink is practically usable when graded A or B.

A: Free of cockling
B: Slight cockling observed
C: Cockling observed

Light Resistance

The sample was subjected to the light resistance test using an evaluation instrument (Ci 35 AW, manufactured by ATLAS under the evaluation condition: black panel temperature of 89±3 degrees C., Xenon arc irradiation intensity of 0.35±0.02 W/m$^2$, and irradiation time of 24 hours.

The color difference ΔE before and after the test was measured with a spectrocolorimeter (939, manufactured by X-Rite Co.). The white ink is practically usable when graded A or B.

A: ΔE≤0.8
B: 0.8<ΔE≤1.5
C: ΔE>1.5

TABLE 1-1

|  |  | Value | Example 1 | Example 2 | Example 3 | Example 4 | Example 5 |
|---|---|---|---|---|---|---|---|
| White coloring material | Titanium dioxide |  |  |  |  |  |  |
|  | Hollow resin particulate A | Y/X = 1.5 |  |  |  |  |  |
|  | Hollow resin particulate B | Y/X = 3.0 |  |  |  |  |  |
|  | Hollow resin particulate C | Y/X = 4.9 |  |  |  |  |  |
|  | Hollow resin particulate D | Y/X = 5.1 | 10.0 | 10.0 | 10.0 | 10.0 | 10.0 |
|  | Hollow resin particulate E | Y/X = 6.0 |  |  |  |  |  |
|  | Hollow resin particulate F | Y/X = 9.3 |  |  |  |  |  |
| Organic solvent | Organic solvent A | 17.4 |  |  |  |  |  |
|  | Organic solvent B | 14.3 | 25.0 | 25.0 | 25.0 | 25.0 | 25.0 |
|  | Organic solvent C | 13.1 | 10.0 | 10.0 | 10.0 | 10.0 | 10.0 |
|  | Organic solvent D | 11.0 |  |  |  |  |  |
|  | Organic solvent E | 10.9 | 2.0 | 2.0 | 2.0 | 2.0 | 2.0 |
| Fluorescent whitener | Fluorescent whitener A |  |  | 0.5 |  |  | 1.0 |
|  | Fluorescent whitener B |  |  |  | 0.005 |  |  |

TABLE 1-1-continued

|  |  | Value | | | | | |
|---|---|---|---|---|---|---|---|
|  | Fluorescent whitener C |  |  |  |  | 0.005 |  |
|  | Fluorescent whitener D |  |  |  |  |  | 0.005 |
| Fluorescent whitening enhancer | Fluorescent whitening enhancer |  |  |  |  |  |  |
| Ultraviolet absorbent | Ultraviolet absorbent |  | 0.01 |  | 0.01 | 0.01 |  |
| Resin particle | Resin particle A | 11.6 | 1.0 | 1.0 | 1.0 | 1.0 | 1.0 |
|  | Resin particulate B | 7.5 | 2.0 | 2.0 | 2.0 | 2.0 | 2.0 |
| Lubricant | Polyethylene wax |  |  |  |  |  |  |
|  | Carnauba wax |  |  |  |  |  |  |
|  | Polydimethylsiloxane compound |  | 0.5 | 0.5 | 0.5 | 0.5 | 0.5 |
| Surfactant | Surfactant |  | 0.5 | 0.5 | 0.5 | 0.5 | 0.5 |
| Defoaming agent | Defoaming agent |  | 0.5 | 0.5 | 0.5 | 0.5 | 0.5 |
| pH regulator | pH regulator |  | 0.5 | 0.5 | 0.5 | 0.5 | 0.5 |
| Preservatives and fungicides | Preservatives and fungicides |  | 0.1 | 0.1 | 0.1 | 0.1 | 0.1 |
| Water | Deionized water |  | 47.4 | 47.9 | 47.9 | 47.9 | 46.9 |
|  | Total |  | 100.0 | 100.0 | 100.0 | 100.0 | 100.0 |
| Mixed solvent SP value |  |  | 13.8 | 13.8 | 13.8 | 13.8 | 13.8 |
| Mixed resin SP value |  |  | 8.9 | 8.9 | 8.9 | 8.9 | 8.9 |
| Heating roller | Roller diameter φ [mm] |  | 150 | 150 | 150 | 150 | 150 |
| Paper | Paper basis weight 70 gsm or less |  | A | A | A | A | A |
| Evaluation item | Lightness L* |  | 76 | 78 | 78 | 73 | 86 |
|  | Fixability (density difference before and after abrasion) |  | A | A | A | A | A |
|  | Precipitation (percent) |  | A | A | A | A | A |
|  | Storage Stability |  | A | A | A | A | A |
|  | Light resistance |  | A | B | A | A | B |
|  | Cockling |  | A | A | A | A | A |

|  |  | Value | Example 6 | Example 7 | Example 8 | Example 9 | Example 10 |
|---|---|---|---|---|---|---|---|
| White coloring material | Titanium dioxide |  |  |  |  |  |  |
|  | Hollow resin particulate A | Y/X = 1.5 |  | 10.0 |  |  |  |
|  | Hollow resin particulate B | Y/X = 3.0 |  |  | 10.0 |  |  |
|  | Hollow resin particulate C | Y/X = 4.9 |  |  |  | 10.0 |  |
|  | Hollow resin particulate D | Y/X = 5.1 | 10.0 |  |  |  |  |
|  | Hollow resin particulate E | Y/X = 6.0 |  |  |  |  | 10.0 |
|  | Hollow resin particulate F | Y/X = 9.3 |  |  |  |  |  |
| Organic solvent | Organic solvent A | 17.4 |  |  |  |  |  |
|  | Organic solvent B | 14.3 | 25.0 | 25.0 | 25.0 | 25.0 | 25.0 |
|  | Organic solvent C | 13.1 | 10.0 | 10.0 | 10.0 | 10.0 | 10.0 |
|  | Organic solvent D | 11.0 |  |  |  |  |  |
|  | Organic solvent E | 10.9 | 2.0 | 2.0 | 2.0 | 2.0 | 2.0 |
| Fluorescent whitener | Fluorescent whitener A |  |  | 0.5 | 0.5 | 0.5 | 0.5 |
|  | Fluorescent whitener B |  |  |  |  |  |  |
|  | Fluorescent whitener C |  | 0.001 |  |  |  |  |
|  | Fluorescent whitener D |  |  |  |  |  |  |
| Fluorescent whitening enhancer | Fluorescent whitening enhancer |  |  |  |  |  |  |
| Ultraviolet absorbent | Ultraviolet absorbent |  | 0.01 | 0.01 | 0.05 | 0.05 | 0.05 |
| Resin particle | Resin particle A | 11.6 | 1.0 | 1.0 | 1.0 | 1.0 | 1.0 |
|  | Resin particulate B | 7.5 | 2.0 | 2.0 | 2.0 | 2.0 | 2.0 |
| Lubricant | Polyethylene wax |  |  |  |  |  |  |
|  | Carnauba wax |  |  |  |  |  |  |
|  | Polydimethylsiloxane compound |  | 0.5 | 0.5 | 0.5 | 0.5 | 0.5 |

TABLE 1-1-continued

|  |  |  |  |  |  |  |
|---|---|---|---|---|---|---|
| Surfactant | Surfactant | 0.5 | 0.5 | 0.5 | 0.5 | 0.5 |
| Defoaming agent | Defoaming agent | 0.5 | 0.5 | 0.5 | 0.5 | 0.5 |
| pH regulator | pH regulator | 0.5 | 0.5 | 0.5 | 0.5 | 0.5 |
| Preservatives and fungicides | Preservatives and fungicides | 0.1 | 0.1 | 0.1 | 0.1 | 0.1 |
| Water | Deionized water | 47.9 | 47.4 | 47.4 | 47.4 | 47.4 |
|  | Total | 100.0 | 100.0 | 100.0 | 100.0 | 100.0 |
| Mixed solvent SP value | | 13.8 | 13.8 | 13.8 | 13.8 | 13.8 |
| Mixed resin SP value | | 8.9 | 8.9 | 8.9 | 8.9 | 8.9 |
| Heating roller | Roller diameter φ [mm] | 150 | 150 | 150 | 150 | 150 |
| Paper | Paper basis weight 70 gsm or less | A | A | A | A | A |
| Evaluation item | Lightness L* | 85 | 68 | 72 | 72 | 76 |
|  | Fixability (density difference before and after abrasion) | A | A | A | A | A |
|  | Precipitation (percent) | A | A | A | A | A |
|  | Storage Stability | A | A | A | A | A |
|  | Light resistance | A | A | A | A | A |
|  | Cockling | A | A | A | A | A |

|  |  | Value | Example 11 | Example 12 | Example 13 | Example 14 |
|---|---|---|---|---|---|---|
| White coloring material | Titanium dioxide | | | | | |
|  | Hollow resin particulate A | Y/X = 1.5 | | | | |
|  | Hollow resin particulate B | Y/X = 3.0 | | | | |
|  | Hollow resin particulate C | Y/X = 4.9 | | | | |
|  | Hollow resin particulate D | Y/X = 5.1 | 5.0 | 20.0 | 10.0 | 10.0 |
|  | Hollow resin particulate E | Y/X = 6.0 | | | | |
|  | Hollow resin particulate F | Y/X = 9.3 | | | | |
| Organic solvent | Organic solvent A | 17.4 | | | | |
|  | Organic solvent B | 14.3 | 25.0 | 25.0 | 25.0 | 25.0 |
|  | Organic solvent C | 13.1 | 10.0 | 10.0 | 10.0 | 10.0 |
|  | Organic solvent D | 11.0 | | | | |
|  | Organic solvent E | 10.9 | 2.0 | 2.0 | 2.0 | 2.0 |
| Fluorescent whitener | Fluorescent whitener A | | 0.5 | 0.5 | 0.5 | 0.5 |
|  | Fluorescent whitener B | | | | | |
|  | Fluorescent whitener C | | | | | |
|  | Fluorescent whitener D | | | | | |
| Fluorescent whitening enhancer | Fluorescent whitening enhancer | | | | 0.02 | 0.2 |
| Ultraviolet absorbent | Ultraviolet absorbent | | 0.01 | 0.01 | | |
| Resin particle | Resin particle A | 11.6 | 1.0 | 1.0 | 1.0 | 1.0 |
|  | Resin particulate B | 7.5 | 2.0 | 2.0 | 2.0 | 2.0 |
| Lubricant | Polyethylene wax | | | | | |
|  | Carnauba wax | | | | | |
|  | Polydimethylsiloxane compound | | 0.5 | 0.5 | 0.5 | 0.5 |
| Surfactant | Surfactant | | 0.5 | 0.5 | 0.5 | 0.5 |
| Defoaming agent | Defoaming agent | | 0.5 | 0.5 | 0.5 | 0.5 |
| pH regulator | pH regulator | | 0.5 | 0.5 | 0.5 | 0.5 |
| Preservatives and fungicides | Preservatives and fungicides | | 0.1 | 0.1 | 0.1 | 0.1 |
| Water | Deionized water | | 52.4 | 37.4 | 47.4 | 47.2 |
|  | Total | | 100.0 | 100.0 | 100.0 | 100.0 |
| Mixed solvent SP value | | | 13.8 | 13.8 | 13.8 | 13.8 |
| Mixed resin SP value | | | 8.9 | 8.9 | 8.9 | 8.9 |
| Heating roller | Roller diameter φ [mm] | | 150 | 150 | 150 | 150 |

TABLE 1-1-continued

| Paper Evaluation item | Paper basis weight 70 gsm or less | C | A | A | A |
|---|---|---|---|---|---|
| | Lightness L* | 70 | 84 | 76 | 81 |
| | Fixability (density difference before and after abrasion) | A | A | A | A |
| | Precipitation (percent) | A | A | A | A |
| | Storage Stability | A | A | A | A |
| | Light resistance | A | A | B | B |
| | Cockling | B | A | A | A |

TABLE 1-2

| | | Value | Example 15 | Example 16 | Example 17 | Example 18 | Example 19 |
|---|---|---|---|---|---|---|---|
| White coloring material | Titanium dioxide | | | | | | |
| | Hollow resin particulate A | Y/X = 1.5 | | | | | |
| | Hollow resin particulate B | Y/X = 3.0 | | | | | |
| | Hollow resin particulate C | Y/X = 4.9 | | | | | |
| | Hollow resin particulate D | Y/X = 5.1 | 10.0 | 10.0 | 10.0 | 10.0 | 10.0 |
| | Hollow resin particulate E | Y/X = 6.0 | | | | | |
| | Hollow resin particulate F | Y/X = 9.3 | | | | | |
| Organic solvent | Organic solvent A | 17.4 | | | | 11.0 | |
| | Organic solvent B | 14.3 | 5.0 | 11.0 | 24.0 | 25.0 | 25.0 |
| | Organic solvent C | 13.1 | | | | 10.0 | 10.0 |
| | Organic solvent D | 11.0 | 30.0 | 22.0 | | | |
| | Organic solvent E | 10.9 | 2.0 | 2.0 | 2.0 | 2.0 | 2.0 |
| Fluorescent whitener | Fluorescent whitener A | | 0.5 | 0.5 | 0.5 | 0.5 | 0.5 |
| | Fluorescent whitener B | | | | | | |
| | Fluorescent whitener C | | | | | | |
| | Fluorescent whitener D | | | | | | |
| Fluorescent whitening enhancer | Fluorescent whitening enhancer | | | | | | |
| Ultraviolet absorbent | Ultraviolet absorbent | | | | | | |
| Resin particle | Resin particle A | 11.6 | 1.0 | 1.0 | 1.0 | 0.4 | 1.8 |
| | Resin particulate B | 7.5 | 2.0 | 2.0 | 2.0 | 2.6 | 1.2 |
| Lubricant | Polyethylene wax | | | | | | |
| | Carnauba wax | | | | | | |
| | Polydimethylsiloxane compound | | 0.5 | 0.5 | 0.5 | 0.5 | 0.5 |
| Surfactant | Surfactant | | 0.5 | 0.5 | 0.5 | 0.5 | 0.5 |
| Defoaming agent | Defoaming agent | | 0.5 | 0.5 | 0.5 | 0.5 | 0.5 |
| pH regulator | pH regulator | | 0.5 | 0.5 | 0.5 | 0.5 | 0.5 |
| Preservatives and fungicides | Preservatives and fungicides | | 0.1 | 0.1 | 0.1 | 0.1 | 0.1 |
| Water | Deionized water | | 47.4 | 49.4 | 47.4 | 47.4 | 47.4 |
| | Total | | 100.0 | 100.0 | 100.0 | 100.0 | 100.0 |
| Mixed solvent SP value | | | 11.4 | 12.0 | 15.0 | 13.8 | 13.8 |
| Mixed resin SP value | | | 8.9 | 8.9 | 8.9 | 8.0 | 10.0 |
| Heating roller | Roller diameter φ [mm] | | 150 | 150 | 150 | 150 | 150 |
| Paper Evaluation item | Paper basis weight 70 gsm or less | | A | A | A | A | A |
| | Lightness L* | | 71 | 73 | 75 | 72 | 75 |
| | Fixability (density difference before and after abrasion) | | A | A | A | A | A |
| | Precipitation (percent) | | A | A | A | A | A |
| | Storage Stability | | B | A | A | A | A |
| | Light resistance | | B | B | B | B | B |
| | Cockling | | A | A | A | A | A |

TABLE 1-2-continued

| | | Value | Example 20 | Example 21 | Example 22 | Example 23 | Comparative Example 1 |
|---|---|---|---|---|---|---|---|
| White coloring material | Titanium dioxide | | | | | | |
| | Hollow resin particulate A | Y/X = 1.5 | | | | | |
| | Hollow resin particulate B | Y/X = 3.0 | | | | | |
| | Hollow resin particulate C | Y/X = 4.9 | | | | | |
| | Hollow resin particulate D | Y/X = 5.1 | 10.0 | 10.0 | 10.0 | | 10.0 |
| | Hollow resin particulate E | Y/X = 6.0 | | | | | |
| | Hollow resin particulate F | Y/X = 9.3 | | | | 10.0 | |
| Organic solvent | Organic solvent A | 17.4 | | | | | |
| | Organic solvent B | 14.3 | 25.0 | 25.0 | 25.0 | 25.0 | 25.0 |
| | Organic solvent C | 13.1 | 10.0 | 10.0 | 10.0 | 10.0 | 10.0 |
| | Organic solvent D | 11.0 | | | | | |
| | Organic solvent E | 10.9 | 2.0 | 2.0 | 2.0 | 2.0 | 2.0 |
| Fluorescent whitener | Fluorescent whitener A | | 0.5 | 0.5 | | 0.5 | 0.5 |
| | Fluorescent whitener B | | | | | | |
| | Fluorescent whitener C | | | | | | |
| | Fluorescent whitener D | | | | | | |
| Fluorescent whitening enhancer | Fluorescent whitening enhancer | | | | | | |
| Ultraviolet absorbent | Ultraviolet absorbent | | | | | 0.01 | 0.001 |
| Resin particle | Resin particle A | 11.6 | 2.5 | 1.0 | 2.5 | 1.0 | 1.0 |
| | Resin particulate B | 7.5 | 0.5 | 2.0 | 0.5 | 2.0 | 2.0 |
| Lubricant | Polyethylene wax | | | | 0.5 | | |
| | Carnauba wax | | | | | | |
| | Polydimethylsiloxane compound | | 0.5 | | 0.5 | 0.5 | 0.5 |
| Surfactant | Surfactant | | 0.5 | 0.5 | 0.5 | 0.5 | 0.5 |
| Defoaming agent | Defoaming agent | | 0.5 | 0.5 | 0.5 | 0.5 | 0.5 |
| pH regulator | pH regulator | | 0.5 | 0.5 | 0.5 | 0.5 | 0.5 |
| Preservatives and fungicides | Preservatives and fungicides | | 0.1 | 0.1 | 0.1 | 0.1 | 0.1 |
| Water | Deionized water | | 47.4 | 47.4 | 47.9 | 47.4 | 47.4 |
| | Total | | 100.0 | 100.0 | 100.0 | 100.0 | 100.0 |
| Mixed solvent SP value | | | 13.8 | 13.8 | 13.8 | 13.8 | 13.8 |
| Mixed resin SP value | | | 10.9 | 8.9 | 10.9 | 8.9 | 8.9 |
| Heating roller | Roller diameter φ [mm] | | 150 | 150 | 150 | 150 | Over 200 |
| Paper | Paper basis weight 70 gsm or less | | C | C | C | A | A |
| Evaluation item | Lightness L* | | 76 | 72 | 71 | 68 | 64 |
| | Fixability (density difference before and after abrasion) | | A | A | B | A | B |
| | Precipitation (percent) | | A | A | A | B | A |
| | Storage Stability | | B | A | B | A | A |
| | Light resistance | | B | B | B | A | A |
| | Cockling | | B | B | A | A | C |

| | | Value | Comparative Example 2 | Comparative Example 3 | Comparative Example 4 | Comparative Example 5 | Comparative Example 6 |
|---|---|---|---|---|---|---|---|
| White coloring material | Titanium dioxide | | | 10.0 | 10.0 | | |
| | Hollow resin particulate A | Y/X = 1.5 | | | | | |
| | Hollow resin particulate B | Y/X = 3.0 | | | | | |
| | Hollow resin particulate C | Y/X = 4.9 | | | | | |
| | Hollow resin particulate D | Y/X = 5.1 | 10.0 | | | 10.0 | 10.0 |

TABLE 1-2-continued

| | | | | | | | |
|---|---|---|---|---|---|---|---|
| | Hollow resin particulate E | Y/X = 6.0 | | | | | |
| | Hollow resin particulate F | Y/X = 9.3 | | | | | |
| Organic solvent | Organic solvent A | 17.4 | | | | | |
| | Organic solvent B | 14.3 | 25.0 | 25.0 | 25.0 | 25.0 | 25.0 |
| | Organic solvent C | 13.1 | 10.0 | 10.0 | 10.0 | 10.0 | 10.0 |
| | Organic solvent D | 11.0 | | | | | |
| | Organic solvent E | 10.9 | 2.0 | 2.0 | 2.0 | 2.0 | 2.0 |
| Fluorescent whitener | Fluorescent whitener A | | | | | 0.5 | |
| | Fluorescent whitener B | | | | | | |
| | Fluorescent whitener C | | | | | | |
| | Fluorescent whitener D | | | | | | |
| Fluorescent whitening enhancer | Fluorescent whitening enhancer | | | | | | |
| Ultraviolet absorbent | Ultraviolet absorbent | | | | 0.001 | | |
| Resin particle | Resin particle A | 11.6 | 1.0 | 1.0 | 1.0 | 1.0 | 1.0 |
| | Resin particulate B | 7.5 | 2.0 | 2.0 | 2.0 | 2.0 | 2.0 |
| Lubricant | Polyethylene wax | | | | | | |
| | Carnauba wax | | | | | | |
| | Polydimethylsiloxane compound | | 0.5 | 0.5 | 0.5 | | 0.5 |
| Surfactant | Surfactant | | 0.5 | 0.5 | 0.5 | 0.5 | 0.5 |
| Defoaming agent | Defoaming agent | | 0.5 | 0.5 | 0.5 | 0.5 | 0.5 |
| pH regulator | pH regulator | | 0.5 | 0.5 | 0.5 | 0.5 | 0.5 |
| Preservatives and fungicides | Preservatives and fungicides | | 0.1 | 0.1 | 0.1 | 0.1 | 0.1 |
| Water | Deionized water | | 47.9 | 47.9 | 47.9 | 47.9 | 47.9 |
| | Total | | 100.0 | 100.0 | 100.0 | 100.0 | 100.0 |
| Mixed solvent SP value | | | 13.8 | 13.8 | 13.8 | 13.8 | 13.8 |
| Mixed resin SP value | | | 8.9 | 8.9 | 8.9 | 8.9 | 8.9 |
| Heating roller | Roller diameter φ [mm] | | Over 200 | Over 200 | Over 200 | Over 200 | Over 200 |
| Paper | Paper basis weight 70 gsm or less | | A | A | A | C | C |
| Evaluation item | Lightness L* | | 63 | 61 | 62 | 60 | 57 |
| | Fixability (density difference before and after abrasion) | | A | B | B | C | B |
| | Precipitation (percent) | | A | C | C | A | A |
| | Storage Stability | | A | B | B | A | A |
| | Light resistance | | B | A | B | B | B |
| | Cockling | | C | C | C | C | C |

Having now fully described embodiments of the present invention, it will be apparent to one of ordinary skill in the art that many changes and modifications can be made thereto without departing from the spirit and scope of embodiments of the invention as set forth herein.

What is claimed is:

1. An image forming method comprising:
applying white ink containing hollow resin particulate to a recording medium; and
contacting a heating roller having a diameter of 200 mm or less with a first surface of the recording medium, and contacting the heating roller with a second surface of the recording medium after the heating roller contacts the first surface.

2. The image forming method according to claim 1, wherein the hollow resin particulate has a 50 percent volume particle diameter (d50) of from 0.4 to 0.6 and a ratio (Y/X) of a maximum intensity Y in 1730 cm$^{-1}$±10 cm$^{-1}$ to a maximum intensity X in 1600 cm$^{-1}$±10 cm$^{-1}$ according to infrared spectroscopy is from 3.0 to 6.0.

3. The image forming method according to claim 1, wherein the recording medium has a basis weight of 70 gsm or less and an application amount of the white ink is 3.0 mg/cm$^2$ or more in the applying.

4. The image forming method according to claim 1, wherein the white ink contains a coumarin derivative or a benzoxazole derivative.

5. The image forming method according to claim 1, wherein the white ink contains an ultraviolet absorbent.

6. The image forming method according to claim 1, wherein the white ink comprises one or more organic solvents, and
wherein a mixing SP value of the one or more organic solvents accounting for 3 percent by mass or more of the white ink is from 12.0 to 15.0 (cal/cm$^3$)$^{0.5}$.

7. The image forming method according to claim 1, wherein the white ink comprises resin particulate comprising at least one of urethane resin particulate and acrylic styrene resin particulate, and
wherein a mixing SP value of the resin particulate accounting for 0.1 percent by mass of the white ink is from 8.0 to 10.0 (cal/cm$^3$)$^{0.5}$.

8. The image forming method according to claim 1, wherein, in the contacting, the heating roller is in contact with the recording medium over an entire region in a width direction of the recording medium, which is perpendicular to a conveying direction of the recording medium.

9. An image forming method comprising:
applying white ink containing hollow resin particulate to a recording medium; and
contacting a heating roller having a diameter of 200 mm or less with a first surface of the recording medium,
wherein the white ink contains a coumarin derivative or a benzoxazole derivative.

10. An image forming apparatus, comprising:
a white ink containing hollow resin particulate;
a white ink applying device configured to apply the white ink to a recording medium; and
a heating roller having a diameter of 200 mm or less configured to contact a first surface of the recording medium to which the white ink has been applied,
wherein the heating roller is further configured to contact a second. surface of the recording medium after the heating roller contacts the first surface.

11. The image forming apparatus according to claim 10, wherein the hollow resin particulate has a 50 percent volume particle diameter (d50) of from 0.4 to 0.6 μm and a ratio (Y/X) of a maximum intensity Y in 1730 $cm^{-1}$ ±10 $cm^{-1}$ to a maximum intensity X in 1600 $cm^{-1}$ ±10 $cm^{-1}$ according to infrared spectroscopy of from 3.0 to 6.0.

12. The image forming apparatus according to claim 10, wherein the recording medium has a basis weight of 70 gsm or less and an application amount of the white ink is 3.0 $mg/cm^2$ or more in the applying.

13. The image forming apparatus according to claim 10, wherein the white ink contains a coumarin derivative or a benzoxazole derivative.

14. The image forming apparatus according to claim 10, wherein th white ink contains an ultraviolet absorbent.

15. The image forming apparatus according to claim 10,
wherein the white ink comprises one or more organic solvents, and
wherein a mixing SP value of the one or more organic solvents accounting for 3 percent by mass or more of the white ink is from 12.0 to 15.0 $(cal/cm^3)^{0.5}$.

16. The image forming apparatus according to claim 10,
wherein the white ink comprises resin particulate comprising at least one of urethane resin particulate and acrylic styrene resin particulate, and
wherein a mixing SP value of the resin particulate accounting for 0.1 percent by mass of the white ink is from 8.0 to 10.0 $(cal/cm^3)^{0.5}$.

17. The image forming apparatus according to claim 10, wherein, when the heating roller contacts the recording medium, the heating roller is in contact with the recording medium over an entire region in a width direction of the recording medium, which is perpendicular to a conveying direction of the recording medium.

* * * * *